April 24, 1951
L. C. BAKER ET AL
APPARATUS FOR MANUFACTURING TUBULATED
BULBS FROM GLASS TUBING
Filed Aug. 7, 1945
2,549,762
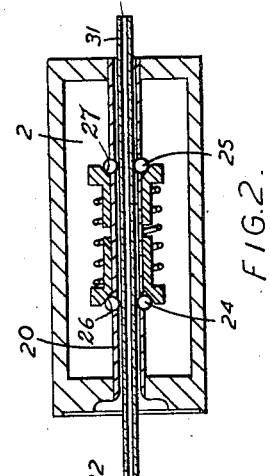
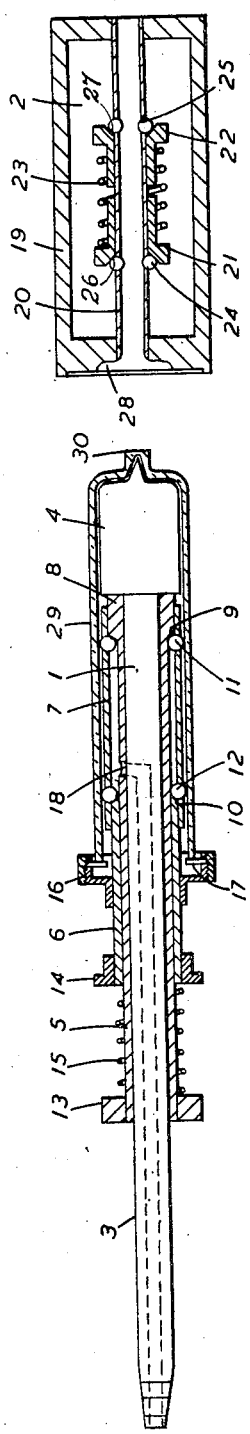
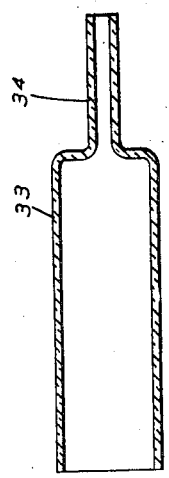
Inventor
LESLIE CHARLES BAKER
JOHN FREDERICK HAINES
By
Attorney

Patented Apr. 24, 1951

2,549,762

UNITED STATES PATENT OFFICE 2,549,762

APPARATUS FOR MANUFACTURING TUBULATED BULBS FROM GLASS TUBING

Leslie Charles Baker and John Frederick Haines, London, England, assignors, by mesne assignments, to International Standard Electric Corporation, New York, N. Y., a corporation of Delaware Application August 7, 1945, Serial No. 609,466
In Great Britain July 26, 1944

Section 1, Public Law 690, August 8, 1946
Patent expires July 26, 1964

7 Claims. (Cl. 49—1)

The present invention relates to the manufacture of tubulated glass bulbs, with particular reference to bulbs for miniature valves.

In miniature valves it is usually necessary to provide an exhaust tubulation at the domed end remote from the base, and in some cases also a wire has to be sealed through the bulb at the point where it is finally sealed off. In such a case the tubulation must be melted down in a vacuum on to a bead already sealed on the wire. When the final sealing off is done on a high speed automatic machine, it is essential that the wall thickness of the glass at the domed end of the tube and particularly at the beginning of the tubulation should be substantially the same in all bulbs so that the melting down can be done in a constant time.

The principal object of the present invention is to provide apparatus for making a bulb with a tubulation at one end which fulfils this requirement.

The invention also provides apparatus for manufacturing tubulated bulbs from glass tubing comprising a first jig adapted to be mounted on the headstock of a glass-working lathe or the like, the said first jig having means for centering and holding a glass tube and a mold portion; and a second jig adapted to be mounted in the tailstock of the said lathe and including a mould portion adapted to co-operate with said mould portion of the first jig for moulding a projecting tip on to the closed-off end of the glass tube and for pressing the glass walls at the said end to a specified thickness. As with conventional glass working lathes, the headstock and tailstock may be rotated at the same speed by a common driving source.

More specifically there is provided apparatus for manufacturing tubulated bulbs from glass tubing comprising two jigs adapted to be mounted respectively in the headstock and tailstock of a glass-working lathe, or the like, whereby the jigs can be simultaneously rotated in a common direction while in axially spaced relationship. The first of the said jigs comprises means for centering and holding a glass tube and means for applying air pressure inside the said tube, and the second jig comprises means for centering and holding a glass tube smaller than the first, the two jigs also are provided at their facing end portions with respectively internal and external molding or shaping surfaces that are adapted to co-operate for molding the end of a glass tube, held in the first jig, that is to be closed off whereby the shaped walls of the tube are made of a predetermined uniform thickness. Additionally the second jig is arranged so that when a tube, having an end molded as aforesaid, is held in the first jig, a tube of relatively small diameter can be held in the second jig and advanced toward the said tube and while both are being rotated about a common axis thereby facilitating joining of the tube by melting of the glass in the usual manner to provide a tubulated bulb.

The invention will be described with reference to the accompanying drawings in which:

Figs. 1 and 2 show sectional views of two jigs used in the process with glass tubes mounted thereon; and Fig. 3 shows a sectional view of a tubulated bulb made with the apparatus of the invention.

The glass bulb is formed according to the invention with the help of two special jigs shown at 1 and 2 in Fig. 1. These jigs are intended to be placed respectively in the headstock and tailstock of a glass-working lathe, or like apparatus, in the relative positions shown. The jig 1 comprises a central tube 3 carrying a nosepiece 4 shaped for moulding the inside of the end of the glass bulb. A sleeve 5 is rigidly fixed to the outside of the tube 3, and a second sleeve 6 slides longitudinally on the outside of the sleeve 5. A third sleeve 7 fits over the sleeve 6 and over an enlargement 8 at the right hand end of the sleeve 5. The sleeves 5 and 6 are bevelled at 9 and 10 to provide annular bearing surfaces for corresponding rings of three or more steel balls 11 and 12 which protrude through corresponding holes in the sleeve 7, the holes being of slightly smaller diameter than the balls. The sleeves 5 and 6 are provided with abutments 13 and 14 between which is compressed a spring 15 which urges the two bevelled surfaces 9 and 10 together thereby urging the balls outwards through the corresponding holes through the sleeve 7, the arrangement forming a spring-loaded ball chuck. A cup 16 rigidly attached to the sleeve 6 contains an annular sealing washer 17 of rubber or like resilient material. Finally, the central bore of the tube 3 communicates with the outside through a hole 18 in the sleeve 5 at a point to the right hand side of the sealing washer 17.

The jig 2 comprises a cylindrical body 19 having a tube 20 passing co-axially therethrough. A spring-loaded ball chuck is provided, comprising two sleeves 21 and 22 which slide on the outside of the tube 20 and compress between them a spring 23 so that two rings of balls 24 and 25 are urged inwards through corresponding holes in the tube 20 by annular bevelled surfaces 26 and 27 at the outer ends of the sleeves 21 and 22. A shaped recess 28 at the left hand end of the body 19 communicates with the central tube 20 and is intended for moulding the outside surface of the bulb in co-operation with the nosepiece 4.

The jigs 1 and 2 having been mounted on the rotatable parts of the lathe in the manner already explained, a plain glass tube 29 with the left hand end cut off square is slipped over the nosepiece 4 and sleeve 7 and will be accurately centered by means of the ball chuck. The left hand end of the tube 29 butts against the sealing washer 17 as shown. The right hand end of the glass tube 29 is heated until soft and is then pulled off or drawn and closed over the nosepiece 4. While the glass is still soft, the tailstock of the lathe carrying the jig 2 is moved towards the left so that the end of the bulb is moulded between the nosepiece 4 and the recess 28. A suitable stop is provided for the tailstock so that the end of the bulb is moulded exactly to the desired thickness. The right hand end of the bulb thus acquires a short moulded cylindrical tip 30.

The two jigs are now separated and a glass tube 31 of small diameter is inserted into the central tube 20 of the jig 2 as shown in Fig. 2. This tube will be centered and held by the corresponding ball chuck, and the end 32 is brought up close to the tip 30 which has just been formed. The glass at the tip 30 is again softened and air is blown through the tube 3 so as to open out the tip 30 to form a short rudimentary tube. The end 32 of the tube 31 is also softened and fused on to the opened out tip 30. When the glass has cooled the bulb so formed may be removed from the jigs and the completed bulb will appear as shown at 33 in Fig. 3 with a glass tubulation 34 at one end. The thickness of the glass near the point where the tube 34 is sealed on to the bulb will be accurately determined by the separation between the nosepiece 4 and the recess 28 when the tailstock is against the stop, so that all bulbs made will be alike in this respect.

What is claimed is:

1. Apparatus for use in conjunction with a glass-working lathe of the type having a headstock and a tailstock rotatable in unison for manufacturing tubulated bulbs from glass tubing, comprising a pair of cooperating jigs, a first of said jigs adapted to be mounted in the headstock of said lathe, the second of said jigs adapted to be mounted in the tailstock of said lathe, said first jig comprising means for centering and holding a first glass tube of a given diameter, an internal shaping element at the end thereof adjacent said second jig and means for applying air pressure inside said first tube; said second jig comprising means for centering and holding a second glass tube, of a diameter smaller than the diameter of said first glass tube, an external shaping element at the end thereof adjacent said first jig; both said shaping elements adapted to cooperate to close off a projecting end of said first tube and to provide same with a projecting tip, said second jig adapted to move a predetermined distance toward said first jig whereby the closed-off end of said first tube is of a predetermined thickness.

2. Apparatus according to claim 1 in which for each jig the centering and holding means comprises a spring-loaded ball chuck.

3. Apparatus according to claim 2 in which the ball chuck for said first jig is adapted to grip the inside surface of said first glass tube adapted to be slipped thereover, and the ball chuck for said second jig is adapted to grip the outside surface of said second glass tube adapted to be slipped therein.

4. Apparatus for use in conjunction with a glass-working lathe of the type having a headstock and a tailstock rotatable in unison for manufacturing tubulated bulbs from glass tubing, comprising a pair of cooperating jigs, a first of said jigs adapted to be mounted in the headstock of said lathe, the second of said jigs adapted to be mounted in the tailstock of said lathe, said first jig comprising means for centering and holding a first glass tube of a given diameter, means for applying air pressure inside said first tube, an internal shaping element at the end thereof adjacent said second jig consisting of a shaped nosepiece with a conical projection, over which nosepiece said first glass tube is adapted to be slipped and closed off; said second jig comprising means for centering and holding a second glass tube of a diameter smaller than the diameter of said first glass tube, an external shaping element at the end thereof adjacent said first jig consisting of a shaped recess complementary to said shaped nosepiece, said recess communicating with a central cylindrical passage through said second jig.

5. Apparatus for use in conjunction with a glass-working lathe of the type having a headstock and a tailstock rotatable in unison for manufacturing tubulated bulbs from glass tubing, comprising a pair of cooperating jigs, a first of said jigs adapted to be mounted in the headstock of said lathe, the second of said jigs adapted to be mounted in the tailstock of said lathe, said first jig comprising means for centering and holding a first glass tube of a given diameter, an internal shaping element at the end thereof adjacent said second jig, means for applying air pressure inside said first tube comprising an axially extending channel communicating with the interior of said first glass tube held by said first jig and the projecting end of which tube is to be closed, and sealing means engaging with the end of said first tube distant from said second jig, whereby a source of air under pressure can be connected through the channel in said first jig to the interior of said first tube; said second jig comprising means for centering and holding a second glass tube of a diameter smaller than the diameter of said first tube, an external shaping element at the end thereof adjacent said first jig, both said shaping elements adapted to cooperate to close off a projecting end of said first tube and to provide same with a projecting tip, said second jig adapted to move a predetermined distance toward said first jig whereby the closed-off end of said first tube is of a predetermined thickness.

6. Apparatus according to claim 5 in which said sealing means comprises an annular washer of resilient material surrounding a cylindrical portion of said first mentioned jig, and being so disposed as to permit the open end of said larger glass tube to butt thereon.

7. Apparatus for use in conjunction with a glass working lathe of the type having a headstock and a tailstock rotatable in unison for manufacturing tubulated bulbs from glass tubing, comprising a pair of cooperating jigs, a first of said jigs adapted to be mounted in the headstock of said lathe, the second of said jigs adapted to be mounted in the tailstock of said lathe, said first jig comprising means for centering and holding a first glass tube of a given diameter, an internal shaping element at the end thereof adjacent said second jig; said second jig comprising means for centering and holding a second glass tube of a diameter smaller than the diameter of said first glass tube, an external shaping element at the end thereof adjacent said first jig, both said shaping elements adapted to cooperate to close off a projecting end of said first tube and to provide same with a projecting tip, said second jig adapted to move a predetermined distance toward said first jig whereby the closed-off end of said first tube is of a predetermined thickness.

LESLIE CHARLES BAKER.
JOHN FREDERICK HAINES.

REFERENCES CITED

The following references are of record in the file of this patent:

UNITED STATES PATENTS

| Number | Name | Date |
|---|---|---|
| 1,547,706 | Whitmore et al. | July 28, 1925 |
| 2,100,656 | Donovan et al. | Nov. 30, 1937 |
| 2,151,840 | Dichter | Mar. 28, 1939 |
| 2,169,315 | Yngve | Aug. 15, 1939 |
| 2,270,162 | Margitta | Jan. 13, 1942 |
| 2,272,927 | Stager | Feb. 10, 1942 |
| 2,306,163 | Greifendorf | Dec. 22, 1942 |
| 2,350,220 | Ehret, Jr. | May 30, 1944 |